United States Patent [19]
Jones et al.

[11] Patent Number: 5,990,053
[45] Date of Patent: Nov. 23, 1999

[54] GELLING AGENT FOR HYDROCARBON LIQUID AND METHOD OF USE

[75] Inventors: Cruise K. Jones; Dennis A. Williams, both of Houston; Curtis C. Blair, East Bernard, all of Tex.

[73] Assignee: Nalco/Exxon Energy Chemicals, L.P., Sugar Land, Tex.

[21] Appl. No.: 08/885,212

[22] Filed: Jun. 30, 1997

[51] Int. Cl.$^6$ .............................. E21B 43/26; C08J 3/09
[52] U.S. Cl. ........................ 507/238; 516/99; 516/104; 556/174
[58] Field of Search .................... 507/238, 922; 252/315.1; 508/368, 370, 429, 433, 435; 516/99, 104; 556/174

[56] References Cited

U.S. PATENT DOCUMENTS

| | | | |
|---|---|---|---|
| 3,397,219 | 8/1968 | Ford et al. | 556/174 |
| 3,727,689 | 4/1973 | Clampitt | 166/283 |
| 3,757,864 | 9/1973 | Crawford et al. | 166/308 |
| 4,104,173 | 8/1978 | Gay et al. | 507/238 |
| 4,174,283 | 11/1979 | Griffin, Jr. | 507/203 |
| 4,200,539 | 4/1980 | Burnham | 507/238 |
| 4,200,540 | 4/1980 | Burnham | 507/238 |
| 4,200,545 | 4/1980 | Clason et al. | 508/248 |
| 4,316,810 | 2/1982 | Burnham | 507/238 |
| 4,595,513 | 6/1986 | Morgenthaler et al. | 507/231 |
| 4,622,155 | 11/1986 | Harris et al. | 507/238 |
| 4,787,994 | 11/1988 | Thorne et al. | 508/435 |
| 4,877,894 | 10/1989 | Huddleston | 558/113 |
| 4,987,241 | 1/1991 | Fukasawa et al. | 556/174 |
| 5,057,233 | 10/1991 | Huddleston | 507/238 |
| 5,110,485 | 5/1992 | Huddleston | 507/238 |
| 5,190,675 | 3/1993 | Mark | 507/238 |
| 5,202,035 | 4/1993 | Huddleston | 507/238 |
| 5,256,231 | 10/1993 | Todd et al. | 508/435 |
| 5,256,320 | 10/1993 | Todd et al. | 508/435 |
| 5,514,645 | 5/1996 | McCabe et al. | 507/238 |
| 5,571,315 | 11/1996 | Smith et al. | 106/285 |
| 5,846,915 | 12/1998 | Smith et al. | 507/238 |

FOREIGN PATENT DOCUMENTS 2 177 711  1/1987  United Kingdom .

*Primary Examiner*—Richard D. Lovering
*Assistant Examiner*—Daniel S. Metzmaier
*Attorney, Agent, or Firm*—Michael B. Martin; Thomas M. Breininger

[57] ABSTRACT

A gelling agent for viscosifying liquid hydrocarbon fracturing fluids is an aluminum salt of a phosphate ester made by forming the ester by reacting $P_2O_5$ with a mixture of organic alcohols which include high molecular weight alcohols or diols selected from hydroxy functional homopolymers, copolymer or terpolymer made from olefins and diolefins selected from the group consisting of ethylene, propylene, butene, butadiene, isoprene, and selected styrenes. The oil based fracturing fluid containing the gelling agent in sufficient concentration to provide a viscosity of between 50 cp and 350 cp at 100° F.

17 Claims, No Drawings

GELLING AGENT FOR HYDROCARBON LIQUID AND METHOD OF USE

FIELD OF THE INVENTION

The present invention relates generally to the fracturing of subterranean formations using gelled hydrocarbons. In one aspect, it relates to a novel oil base composition (and method of manufacturing) for fracturing subterranean formations. In another aspect, the invention relates to the use of a novel phosphate salt gelling agent.

DESCRIPTION OF THE PRIOR ART

Hydraulic fracturing has been widely used as a means for improving the rates at which fluids can be injected into or withdrawn from subterranean formations surrounding oil wells and similar boreholes. The methods employed normally involve the following steps: injection of a viscous fracturing fluid having a low fluid loss value into the well at a rate sufficient to generate a fracture in the exposed formation, the introduction of fluid containing suspended propping agent particles into the resultant fracture, and the subsequent shutting in of the well until the formation is closed on the injected particles. This results in the formation of vertical, high-conductivity channels through which fluids can thereafter be injected or produced. The conductivity in the propped fracture is the function of the fracture dimensions and the permeability of the bed of propping agent particles within the fracture.

In order to generate the fracture of sufficient length, height, and width and to carry the propping agent particles into the fracture, it is necessary for the fluid to have relatively high viscosity. This requires the use of gelling agents in the fracturing fluid.

Fracturing fluids are generally water or oil-based liquids gelled with polymers. However, the water-based liquids cannot be used in the fracturing of many water sensitive formations. Fracturing in these formations requires the use of oil-based liquids.

The most common gelling agent for oil-based fracturing fluids has been aluminum salts of phosphate esters. The following references disclose phosphate ester gelling agents:

(a) U.S. Pat. No. 4,104,173 discloses gelling agents prepared by
  (i) reacting phosphorous pentoxide with monohydric alcohols and
  (ii) reacting this product with a basic aluminum compound.

(b) The gelling agent disclosed in U.S. Pat. No. 4,316,810 is prepared by
  (i) reacting phosphorous pentoxide with ethereal alcohols prepared by reacting ethylene oxide or propylene oxide with selected aliphatic alcohols to form a phosphate ester and
  (ii) reacting phosphate ester with an aluminum compound to form the aluminum salt of the phosphate ester.

(c) U.S. Pat. No. 4,787,994 discloses the use of an oil with a gelling agent prepared by reacting an orthophosphate ester with an aluminum activator. The acid is mixed with the orthophosphate ester prior to the addition of the activator.

(d) In U.S. Pat. Nos. 4,877,894 and 5,057,233, gelling agents are prepared by
  (i) reacting triethyl phosphate with phosphorous pentoxide to form a polyphosphate intermediate,
  (ii) reacting the polyphosphate intermediate with a mixed aliphatic alcohol. This product is then reacted with an aluminum activator to form the aluminum alkylphosphate ester gelling agent.

(e) U.S. Pat. No. 5,190,675 discloses a metal phosphate diester prepared by reacting a triester phosphate with $P_2O_5$ to form a polyphosphate which is reacted with an alcohol to produce a phosphate diester. The diester is then contacted with an aluminum source (in the hydrocarbon liquid) to form the aluminum phosphate diester.

(f) U.S. Pat. No. 5,202,035 discloses a gelling agent similar to that disclosed in 5,057,233, except that an aluminum sulfate was used as a mixture with the aliphatic alcohol.

(g) U.S. Pat. No. 5,514,645 discloses a gelling agent comprising two components to be added to the liquid hydrocarbon:
  (i) an alkyl orthophosphate acid ester partially neutralized with an alkali metal hydroxide, and
  (ii) a source of aluminum or ferric ions.

(h) U.S. Pat. No. 5,571,315 disclose gelling agents made by reacting ferric salts with orthophosphate esters.

(i) U.S. Pat. No. 4,200,540 discloses gelling agents made from reacting low molecular weight alcohols with phosphorous pentoxide, which in turn is reacted with a basic aluminum compound.

SUMMARY OF THE INVENTION

The gelling agent of the present invention is an aluminum salt of a phosphate ester wherein such salt includes a minor amount of a compound having the following formula.

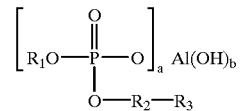

Where
  a = 1 to 3
  b = 0 to 2
  a + b = 3
  $R_1$ is an alkyl or aryl group having from 1 to 24 carbon atoms, preferably an alkyl
  group having from 6 to 12 carbon atoms, and most preferably a mixture of $C_6$, $C_8$,
  and $C_{10}$ alkyl groups or $C_6$ and $C_{10}$ alkyl groups;
  $R_2$ is a (a) homopolymer of olefins and diolefins selected from propylene, butene,
  butadiene, isoprene, and styrene, or (b) a copolymer or terpolymer of olefins and
  of 500 to 10,000, preferably from 750 to 5,000 and most preferably from 1,000 to
  4,000. ($R_2$ preferably is free of any in-chain O atoms); and
  $R_3$ is H or OH.
  (As used herein, molecular weight means number average molecular weight.)

In practice the gelling agent is made by forming a phosphate ester by reacting $P_2O_5$ with a mixture of (a) low molecular weight alcohols or diols and (b) high molecular weight alcohols or diols. The phosphate ester is then reacted with a basic aluminum compound.

The high molecular weight alcohols or diols (which produce $R_2$ in the above formula) comprise from 0.05 to 5 wt %, preferably 0.1 to 3 wt %, most preferably 0.5 to 2 wt % of the mixture. The compound of the above formula thus will constitute only from 0.05 to 5.0, preferably 0.1 to 3.0 wt %, most preferably 0.5 to 2 wt % of the aluminum salt of the phosphate ester, the balance of the salt being derived from the low molecular weight alcohols or diols.

The gelling agent may be preformulated and added to an oil-based fracturing fluid (e.g. hydrocarbon liquid) in sufficient concentration and proper pH (by addition of a base such as KOH) to substantially increase the viscosity of the hydrocarbon liquid. Also, the hydrocarbon liquid can be gelled in situ by the addition of two separate components to the hydrocarbon liquid:

(1) a phosphate ester acid having the following formula

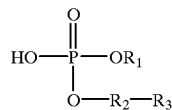

where $R_1$, $R_2$, and $R_3$ are as described above; and (2) an aluminum basic compound such as sodium aluminate, aluminum isopropoxide, or hydrated alumina. (Excess amounts of the aluminum basic compound may be used to achieve proper pH for gelling (pH range 3.0–5.0)

In either the preformulated gelling agent, or the in-situ formulated gelling agent, the hydrocarbon liquid is gelled by the aluminum salt of the phosphate ester described above at the proper pH.

The gelling agent differs from the prior art aluminum salts of phosphate ester by the molecular weight of the alcohol or diol starting materials which correspond to the $R_2$ group in the ester and salt formulas. In a preferred embodiment, the gelling agent further differs by the fact that there are no in-chain O atoms in $R_2$ of the esters and salts thereof. The absence of the O atoms in $R_2$ is believed to be beneficial because of increased in-chain stability, particularly increased hydrolytic stability versus alkoxy chains.

Tests have shown that the high molecular weight $R_2$ group in the gelling agent results in faster viscosity development in the hydrocarbon liquid fracturing fluid. Although the reasons for the improved results are not fully understood, it is believed that the higher molecular weight $R_2$ results in a macromer (i.e. large monomer) which facilitates cross linking thereby developing the three dimensional network necessary for gelling the oil.

In summary, the present invention contemplates an improved oil base fracturing fluid gelling agent, an improved method of gelling an oil-base fracturing fluid, and an improved gelled oil-based fracturing fluid.

DESCRIPTION OF THE PREFERRED EMBODIMENTS

The gelling agent of the present invention is prepared by reacting a high molecular weight monohydric alcohol or diol with $P_2O_5$ to form an ester having the following formula (I)

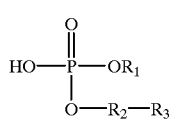

(I)

Where $R_1$ is an alkyl or aryl group having from 1 to 24 carbon atoms;

$R_2$ is a homopolymer of propylene, or a copolymer or terpolymer of such homopolymers and further including ethylene; and $R_3$ is —OH or H, depending on the alcohol or diol starting material.

Another method of preparing the ester is to first react $P_2O_5$ with an alkyl phosphate such as triethylphosphate to form an intermediate (as described in U.S. Pat. Nos. 4,877,894 and 5,110,485) and then reacting the intermediate with the high molecular weight alcohol. In either process the ester of Formula (I) is formed.

The ester (Formula I) is reacted with a basic aluminum compound to form an aluminum salt having the following formula (II):

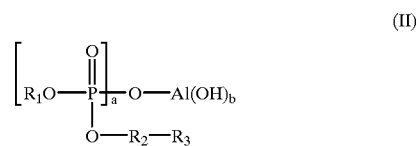

(II)

Where $R_1$, $R_2$, and $R_3$ are as described in Formula I; and $a=1$ to 3

$b=0$ to 2, and $a+b=3$

The aluminum compound may be selected from a variety of basic compounds including sodium aluminate, aluminum isoproproxide, and hydrated alumina.

The high molecular weight alcohols or diols useable to prepare the ester include a wide range of polymers, copolymers, and terpolymers prepared from olefins and diolefins selected from the group consisting of ethylene, propylene, butylene, butadiene, isoprene, and selected styrene monomers. The degree of polymerization of the polymer, copolymer, or terpolymer should be sufficient to produce a compound having a number average molecular weight of 500 to 10,000, preferably 750 to 5,000, and most preferably 1,000 to 4,000.

Specific examples of the monohydric alcohols include hydroxyl functional polymers having the formula:

Where $R_2$ is polypropylene having from 35 to 700 C atoms polybutylene having from 35 to 700 C atoms poly(ethylene/propylene) having from 35 to 500 C atoms poly(ethylene/butylene) having from 35 to 700 C atoms polyisoprene-poly(ethylene/butylene) having from 35 to 700 C atoms poly(ethylene/butylene/styrene) having from 35 to 800 C atoms polyisoprene-poly(ethylene/butylene/styrene) having from 35 to 700 C atoms block copolymers of poly(ethylene/butylene) having from 35 to 700 C atoms The usable diols have the following formula:

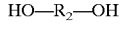

Where $R_2$ may be as described above for the monohydric alcohols.

Most of the high molecular weight monohydric alcohols and diols mentioned above are either commercially available or may be manufactured by methods well known in the art. The preferred alcohols and diols are as follows:

poly(ethylene/butylene): diol marketed under the trademark KRATON LIQUID™ L-2203 Polymer by Shell Chemical Company.

polyisoprene-poly(ethylene/butylene/styrene): alcohol marketed under the trademark KRATON LIQUID™ Polymer Research Product HPVM 1301 by Shell Chemical Company.

poly(ethylene/butylene): alcohol marketed under the tradename of KRATON LIQUID™ Polymer Research Product HPVM 1302 poly(ethylene/butylene): alcohol marketed under the tradename of KRATON LIQUID™ L-1203 Polymer by Shell Chemical Company.

The preferred polyalcohol is poly(ethylene/butylene) diol L-2203. The diol has a number average molecular weight of 3,400. The reaction of this copolymer with phosphorus pentoxide produces an ester having the following formula (III):

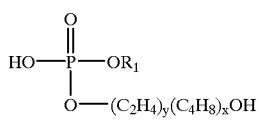

(III)

Where

R₁ is the same as in Formula I x is an integer ranging from 1 to 20, y is an integer having a lower value of 1 and an upper value defined by the molecular weight of the diol (500 to 10,000, preferably 750 to 5,000, most preferably 1,000 to 4,000).

The Formula III ester upon reaction with aluminum compound forms the aluminum salt having the formula of (IV)

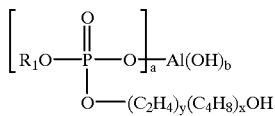

(IV)

Where R₁, a, b, x, and y are as defined in Formula III.

Note that if the monohydric alcohol of the poly(ethylene/butylene) is used instead of the diol the terminal OH group bonded to the C₄H₈ group is —H instead —OH.

OPERATIONS

As mentioned above the high molecular weight components of the aluminum salt of the phosphate ester (Formulas II and IV) will constitute a very minor percent of the gelling agent. A major percent of the aluminum salt of the phosphate ester will be those made from low molecular weight alcohols or diols as for examples those made in accordance with any one of the following U.S. Pat. Nos. 4,877,894, 5,057,233 and 5,110,485, the disclosures of which are incorporated herein by reference.

The gelling agent thus comprises a high molecular weight component and a low molecular weight component.

In one preferred embodiment, the formulation of the gelling agent may be as follows:

(a) from 0.05 to 5.0 wt % of an aluminum salt of a phosphate ester and having the following formula:

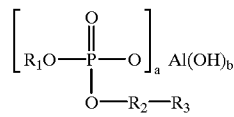

(b) from 95 to 99.5 wt % of an aluminum salt of a phosphate ester having the following formula:

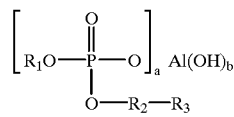

Where in both (a) and (b)

a = 1 to 3 b = 0 to 2 a + b = 3

R₁ is an alkyl or aryl group having from 1 to 24 carbon atoms;

R₂ is (a) a homopolymer of propylene, butene, isoprene, butadiene, styrene, methyl styrene, t-butyl styrene; or (b) a copolymer, or terpolymer of ethylene, propylene, butene, isoprene, butadiene, styrene, methyl styrene, or t-butyl styrene; and has a molecular weight of 500 to 10,000; and R₃ is —OH or —H The gelling agents for hydrocarbon liquids may be prepared in advance and added to the hydrocarbon liquid with a basic activator or may be formed in situ as described above.

In practice, a mixture of low molecular weight alkyl alcohols or diols and the high molecular weight alcohols or diols will be used to form the phosphate ester. The low molecular weight alkyl alcohols or diols preferably include C₆ to C₁₀ alcohols or diols. The alcohol mixture, however will contain from 0.05 to 5.0 wt. %, preferably from 0.1 to 3.0 wt % of the high molecular weight alcohol or diol. Tests have shown that concentrations below 0.05 wt. % are not effective and wt. % above 5.0 wt. %, particularly 3.0 wt % may result in insoluble gels. The low molecular weight alcohols (or diols) and the high molecular weight alcohols (or diols) may be added as a mixture or added separate in the production of the phosphate ester.

In operations wherein the preformulated gelling agent is used, the gelling agent is added to the oil base fracturing fluid (described below) with a strong base activator such as aqueous solution of an alkali metal hydroxide (e.g. KOH) or a low molecular weight amine or polyamine (e.g. triethanol amine), along with a small amount of water. The amount of base should provide the oil base fracturing fluid with a pH of between 3.0 and 5.0.

Alternatively, the method of the present invention may be carried out by separately introducing the phosphate ester and aluminum compound into the oil-base liquid (fracturing liquid) such as kerosene, diesel, gas, oil, fuel oil, crude oil, and the like. The addition may be concurrent or separate. (Preferably, however) the phosphate ester is added to the oil-base liquid followed by the addition of the aluminum compound. It is preferred also to add a small amount of sodium hydroxide and water to increase the pH to optimum gelling range at the time the aluminum compound is added. The final pH should be partially acidic.

The phosphate ester and aluminum compound (e.g. sodium aluminate) at the proper pH react in the oil to form the aluminum phosphate salt gelling agent. The relative amount of the ester and aluminum compound will be stoichiometric in approximate proportion in accordance with Formula II.

In either the preformulated or in-situ formulated method, the amount of the salt gelling agent should produce initial viscosity of at least 50 cp at 100° F., preferably between 50 cp and 350 cp at 100° F. as measured by Fann 50C Viscometer at 118 rpm. ($r_1$:$b_5$ rotor/bob configuration.)

In most applications the concentration of the gelling agent will be from 0.5 to 4.0 wt %, preferably 0.7 to 2.0 wt %, of the oil-base liquid.

The gelled hydrocarbon liquid is pumped into the formation at a rate and pressure to fracture the formation. Propping agents are carried in the gelled fracturing fluid and placed in the fracture. Following the fracturing treatment, the well is shut in. Preferably fracturing liquid will contain a breaker to cause the fluid to revert to a low viscosity state thereby facilitating cleanup. A variety of breakers are available including sodium bicarbonate, calcium hydroxide, and magnesium hydroxide.

Other additives which may be included in the fracturing fluid include corrosion inhibitors, surfactants, wetting agents, and the like.

EXAMPLES

Example I
Prior Art Using Low Molecular Weight Phosphate Ester Monomers

To a 2-liter resin kettle equipped with an overhead stirrer stirring rod, thermowell condenser, Dean Stark trap and flask heating tape was added 1) bulk triethyl phosphate (liquid) and 2) bulk phosphorous pentoxide (solid) while stirring. Exotherm was almost immediately observed, with temperature ascending from room temp to about 45 Celsius in less than about five minutes. Stirring was continued with applied heat (to about 76–80 Celsius) for about 30 minutes (Note: The contents of the flask at this stage represents a non-viscous translucent slurry) at which time a solution containing aliphatic/aromatic hydrocarbon, and octyl, hexyl, and decyl alcohols was added. Temperature dropped to about 45 Celsius and subsequently heat was applied (range 70–95 Celsius) for one hour. Within the first 15 minutes, flask contents changed from slurry to clear solution. Allowed to cool and labeled Comp 1. Total batch size was 400 grams: compositional data is given in Table I below:

TABLE I

| Phosphorous Pentoxide | 14 |
|---|---|
| Triethyl Phosphate | 24 |
| C-6,8,10 Alcohol Solution | 37 |
| Heptane/xylene | 25 |

To a 1-quart baffle-design Waring Blender set in the HIGH STIR position and equipped with a variable A/C controller and rotor-stator homogenizer was added the following:

1) 200.0 mls kerosene, slow stirring begun followed by addition of:
2) 2.0 mls Comp 1 (stirring to 40 variable A/C setting) followed by:
3) 0.45 mls 22.5 wt % aqueous sodium aluminate (freshly prepared by dilution of 45 wt % aqueous sodium aluminate, Vinings Chemical) followed by mixing according to the variable A/C profile below:

Stirring was conducted according to the following profile:

| Seconds | Variable A/C Setting |
|---|---|
| 0–15 | 40 |
| 15–30 | 60 |
| 30–40 | 70 |
| 40–80 | 90 |

The above mixing profile accommodated mixing without splash of the liquid form out of the top of the mixer.

After the 80 second mix, removed 52 mls of the fluid via syringe and injected into a Fann 50C rotor cup, followed by installation onto the r1:b5(rotor/bob) configuration. Rheology conducted at 100° Fahrenheit at 118 rpm for 1.5 hours.

The corresponding data from the Example I is presented in Table II.

Example II
Using High Molecular Weight Phosphate Ester Copolymer

The process described in Example I was repeated except 0.00147 moles of poly (ethylene/butylene) copolymer diol (KRATON LIQUID™ L2203 Polymer) was substituted for 0.00147 moles of 1-hexanol.

The ester produced by the reactor was labeled Sample A and had the composition shown in Table II.

The aluminum salt of Sample A reacted with sodium aluminate as described in Example I and viscosity measurements were taken. The data are presented in Table II.

Example III–V

Experiment II was repeated in Experiments III–V producing Samples B, C, D and E. The composition of the ingredients used in these reactions are shown in Table II

TABLE II

| | Samples | | | | |
|---|---|---|---|---|---|
| Ingredient | A | B | C | D | E |
| phosphorous pentoxide (wt %) | 14 | 14 | 14 | 14 | 14 |
| triethyl phosphate (wt %) | 24 | 24 | 24 | 24 | 24 |
| $C_6$, $C_8$, $C_{10}$ alcohol sol. (wt %) | 36.38 | 35.6 | 36.2 | 35.9 | 36.0 |
| poly (ethylene/butylene) (wt %) | 0.62 | 1.4 | 0.8 | 1.1 | 1.0 |
| aliphatic/aromatic hydrocarbon (wt %) | 25 | 25 | 25 | 25 | 25 |

The results of the viscosity tests using aluminum salts on Samples Comp 1, A–E are presented in Table III.

TABLE III

| | Viscosity (cps) | | | | | |
|---|---|---|---|---|---|---|
| | | | Samples | | | |
| Time (mins) | Comp 1 | A | B | C | D | E |
| 5 | 199 | 334 | 253 | 236 | 297 | 289 |
| 10 | 256 | 324 | 278 | 243 | 274 | 272 |
| 15 | 263 | 323 | 296 | 248 | 272 | 285 |
| 45 | 193 | 301 | 285 | 248 | 267 | 278 |
| 60 | 196 | 289 | 275 | 256 | 264 | 281 |

The above data demonstrates the effectiveness of the high molecular weight diols (even at minute concentrations) in producing an aluminum salt gelling agent in comparison to the low molecular weight monohydric alcohols.

What is claimed is:

1. A gelling agent for hydrocarbon liquids comprising an aluminum salt of a phosphate ester, wherein the salt of the phosphate ester comprises minor amounts of a compound having the following formula:

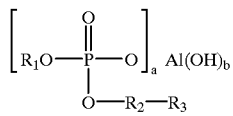

wherein
a=1 to 3
b=0 to 2
a+b=3
$R_1$ is an alkyl or aryl group having from 1 to 24 carbon atoms, preferably an alkyl
group having from 6 to 12 carbon atoms, and most preferably a mixutre of $C_6$, $C_8$,
and $C_{10}$ alkyl groups or $C_6$ and $C_{10}$ alkyl groups;
$R_2$ is a (a) homopolymer of olefins and diolefins selected from propylene, butene,
butadiene, isoprene, and styrene, or (b) a copolymer or terpolymer of olefins and
of 500 to 10,000, preferably from 750 to 5,000 and most preferably from 1,000 to
4,000. ($R_2$ preferably is free of any in-chain O atoms); and
$R_3$ is H or OH.

2. The gelling agent of claim 1 wherein $R_3$ is OH.

3. The gelling agent of claim 1 wherein $R_2$ is a copolymer of ethylene and butylene having a number average molecular weight of 750 to 5,000.

4. The gelling agent of claim 1 wherein $R_1$ is an alkyl group having from 6 to 12 carbon atoms.

5. The gelling agent of claim 1 wherein $R_2$ is a copolymer or terpolymer of ethylene, propylene, butene or isoprene.

6. The gelling agent of claim 5 wherein $R_3$ is OH.

7. The gelling agent of claim 6 wherein $R_2$ is a copolymer of ethylene and butylene.

8. The gelling agent of claim 1 wherein said compound has the following formula:

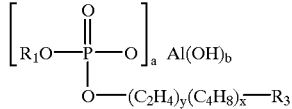

where
$R_1$, $R_3$, a and b are as defined in claim 1;
x is an integer ranging from 1 to 20; and
y is an integer having a lower value of 1 and an upper value such that the number average molecular weight of $-(CH_2CH_4)_y(C_4H_8)_x-$ is between 750 and 5,000.

9. The gelling agent of claim 8 wherein $R_3$ is —OH.

10. A gelled hydrocarbon liquid comprising
(a) a hydrocarbon liquid, and
(b) an effective amount of the gelling agent as defined in claim 1 to impart a viscosity of between 50 and 350 cp at 100° F. based on Fann 50C Viscometer at 118 shear rate at r1:b5 (rotor\bob) configuration.

11. The gelled hydrocarbon liquid of claim 10 wherein the hydrocarbon liquid contains from 0.5 to 4.0 wt % of the gelling agent.

12. A gelling agent for hydrocarbon liquids which comprises
(a) from 0.05 to 5.0 wt % of an aluminum salt of a phosphate ester and having the following formula:

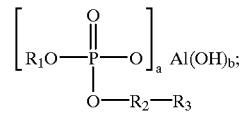

and
(b) from 95.0 to 99.5 wt % of an aluminum salt of phosphate ester having the following formula:

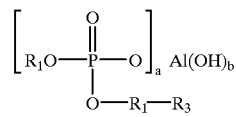

wherein in both (a) and (b)
a=1 to 3
b=0 to 2
a+b=3
$R_1$ is an alkyl or aryl group having from 1 to 24 carbon atoms;
$R_2$ is a homopolymer of propylene, butene, isoprene, or styrene; or a copolymer, or terpolymer of ethylene, propylene, butene, isoprene or styrene, and has a number average molecular weight of 500 to 10,000; and
$R_3$ is H or OH.

13. A gelling agent for viscosifying an oil-base fracturing fluid which is the reaction product of
(a) the reaction product of phosphorus pentoxide and a mixed alcohol comprising (i) from 95.0 to 99.95 wt % of a alkyl alcohols having from 6 to 12 carbon atoms, and (ii) 0.05 to 5.0 wt % of a high molecular weight organic alcohol or diol having a number average molecular weight of 500 to 10,000 wherein the high molecular weight alcohol or diol is a hydroxy functional homopolymer, copolymer or terpolymer of olefins or diolefins selected from the group consisting of ethylene, propylene, butylene, isoprene, styrene, butadiene, methyl styrene and t-butyl styrene; and
(b) a basic aluminum compound.

14. The gelling agent of claim 13 wherein the high molecular weight alcohol or diol is a copolymer of ethylene and butylene having a number average molecular weight between 750 and 5,000.

15. A method of forming a gelled hydrocarbon liquid and treating a subterranean formation comprising the steps of:
(a) forming a phosphate ester having the following formula:

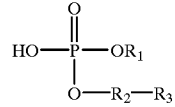

wherein
$R_1$ is an alkyl or aryl group having from 1 to 24 carbon atoms, preferably an alkyl
group having from 6 to 12 carbon atoms, and most preferably a mixutre of $C_6$, $C_8$, and $C_{10}$ alkyl groups or $C_6$ and $C_{10}$ alkyl groups;

$R_2$ is a (a) homopolymer of olefins and diolefins selected from propylene, butene, butadiene, isoprene, and styrene, or (b) a copolymer or terpolymer of olefins and of 500 to 10,000, preferably from 750 to 5,000 and most preferably from 1,000 to 4,000. ($R_2$ preferably is free of any in-chain O atoms); and $R_3$ is H or OH.

(b) adding the phosphate ester to a hydrocarbon liquid;

(c) adding a basic aluminum compound to the hydrocarbon liquid containing the phosphate ester wherein the phosphate ester and aluminum compound react to form a salt of the phosphate ester; and (d) pumping the hydrocarbon liquid containing the salt of the phosphate ester prepared in step (c) into a subterranean formation.

16. The method of claim 15 wherein the step of pumping the hydrocarbon liquid into a subterranean formation is at conditions to form a fracture therein.

17. A method of forming a gelled hydrocarbon liquid comprising the steps of:

(a) forming a phosphate ester by reacting $P_2O_5$ with (i) a mixture of $C_6$–$C_{12}$ alcohols and (ii) a high number average molecular weight alcohol or diol selected from homopolymers of propylene, butylene, isoprene or styrene; or copolymers of ethylene, propylene, butylene, isoprene, or styrene, and having a number average molecular weight of 750 to 5,000;

(b) reacting the phosphate ester of step (a) with a basic aluminum compound to form a salt of the phosphate ester; and (c) adding the salt of the phosphate ester formed in step (b) to a hydrocarbon liquid in an effective amount to gel the hydrocarbon liquid.

* * * * *